United States Patent [19]
Matsuo et al.

[11] 3,829,046
[45] Aug. 13, 1974

[54] PROGRAMMABLE, REVERSIBLE DRAG, MULTI-STAGE PARACHUTE

[75] Inventors: Jon T. Matsuo; Lawrence E. Neipling, both of El Centro, Calif.

[73] Assignee: The United States of America as represented by the Secretary of the Navy, Washington, D.C.

[22] Filed: Mar. 16, 1973

[21] Appl. No.: 341,808

[52] U.S. Cl. .............................................. 244/152
[51] Int. Cl. ............................................ B64d 17/34
[58] Field of Search ............ 244/142, 145, 149, 152

[56] References Cited
UNITED STATES PATENTS

| | | | |
|---|---|---|---|
| 2,342,287 | 2/1944 | Lisi | 244/152 |
| 3,408,026 | 10/1968 | Kriesel | 244/152 |
| 3,721,409 | 3/1973 | Matsuo | 244/152 |

*Primary Examiner*—George E. A. Halvosa
*Assistant Examiner*—Charles E. Frankfort
*Attorney, Agent, or Firm*—R. S. Sciascia; G. J. Rubens

[57] ABSTRACT

A multi-stage, variable drag parachute wherein the canopy drag area can be reversibly increased or decreased in programmable increments during deployment by means of one or more variable length, nonelastic control lines. The length of the control lines are controlled at a point remote from the canopy by releasable connections that deploy the respective canopy increments, each deployed canopy increment being self-sustaining as an independent and integral portion of the entire canopy.

11 Claims, 12 Drawing Figures

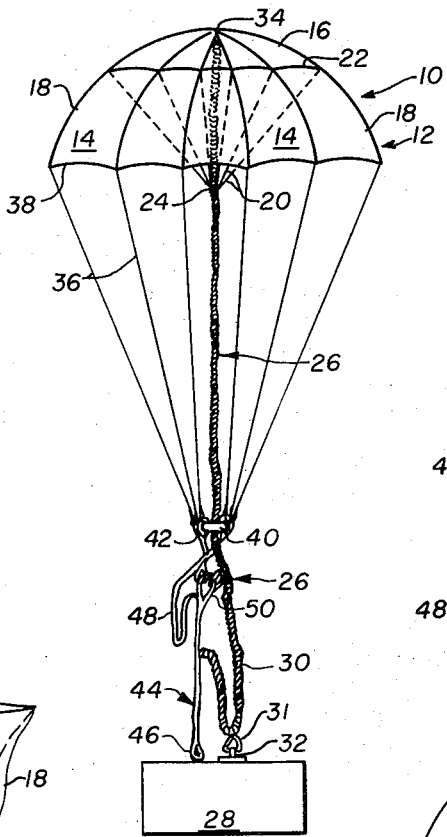
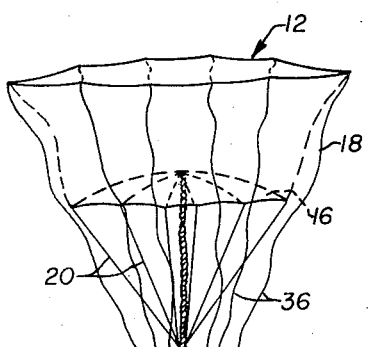
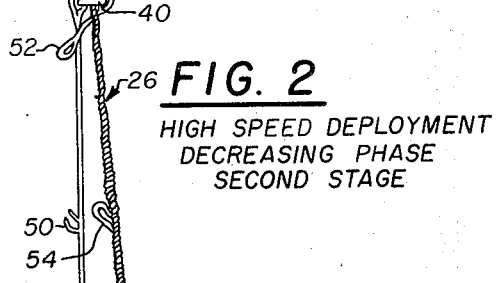
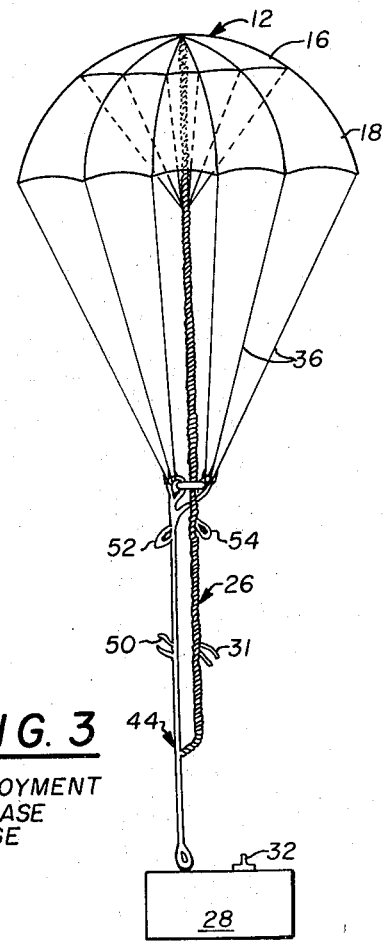
FIG. 1a
FIG. 1b
FIG. 1
INITIAL DEPLOYMENT
FIRST STAGE
FIG. 2
HIGH SPEED DEPLOYMENT
DECREASING PHASE
SECOND STAGE
FIG. 3
HIGH SPEED DEPLOYMENT
INCREASING PHASE
THIRD STAGE

LOW SPEED DEPLOYMENT
LOW SPEED PHASE

INITIAL DEPLOYMENT
FIRST STAGE

HIGH SPEED DEPLOYMENT
DECREASING INTER. PHASE
SECOND STAGE

PATENTED AUG 13 1974　　　　　　　　　　　　　3,829,046

HIGH SPEED DEPLOYMENT
DECREASING INTER. PHASE
THIRD STAGE

HIGH SPEED DEPLOYMENT
INCREASING INTER. PHASE
FOURTH STAGE

HIGH SPEED DEPLOYMENT
FIFTH STAGE

LOW SPEED DEPLOYMENT 3,829,046

PROGRAMMABLE, REVERSIBLE DRAG, MULTI-STAGE PARACHUTE

CROSS-REFERENCES TO RELATED APPLICATIONS

This invention is related to several copending patent applications filed on Feb. 25, 1972 as Ser. No. 229,414, now U.S. Pat. No. 3,773,284, entitled "A Controllable Multi-stage Increasing Drag Parachute;" on June 25, 1972, Ser. No. 156,750, now U.S. Pat. No. 3,721,409 for "A Controlled Multi-Stage Decreasing Drag Parachute;" and on May 18, 1972, Ser. No. 254,705 for "Reversible-Drag, Multi-Stage Parachute."

BACKGROUND OF THE INVENTION

This invention relates to parachute construction designed primarily as a reversible, variable drag parachute, but it is to be understood that it can be used for any purposes for which it is found applicable.

It is customary among designers and users of parachutes to descriptively name the various types of parachutes according to their intended use in any specific application, i.e., an increasing drag or decreasing drag parachute. In practice, a proper size of parachute canopy exists for any given environment. The principle factors which determine a canopy size or drag area is its primary use, together with airspeed and altitude of deployment. In certain applications it is necessary to vary the canopy drag area temporarily during deployment to accommodate conditions which exceed the designed limits of the parachute components and which may destroy the parachute integrity.

The use of "reefing" for reducing temporarily the projected diameter of a parachute canopy, and therefore its drag surface is a long established technique, and various devices have been employed to accomplish this purpose with varying degrees of success. However, the speed at which such a reefed parachute can be deployed safely is limited. Furthermore, the conventional reefing mechanism is normally housed within the parachute canopy where it is subject to the developed forces during deployment with the attendant possibility of damage.

Two of the aforementioned patent applications change the canopy size for either increasing or decreasing drag conditions, but the parachutes are not reversible in their operations. That is, once the drag area is changed, the parachute canopies cannot be restored back to their original configuration, and thus they are committed to the changed condition. The third patent application provides a reversible multi-stage parachute with means for automatically controlling the activation and deactivation of the several canopy stages through predetermined settings, such as by a multiple winch system.

The present invention provides a multi-stage parachute canopy that can conversely increase or decrease its projected drag area, depending on a preprogrammed use of separable connections, such as break cords, shear links, time delay cutters, positioned in the respective control lines to control the slack provided in the lines. Such a construction enables the canopy drag surface to be varied reversibly in accordance with known drag requirements.

SUMMARY OF THE INVENTION

A reversible drag parachute is provided by constructing a multi-stage parachute with preprogrammable means for controlling the activation and deactivation of the several stages of a composite canopy in accordance with the drag requirements imposed on the parachute in a specific deployment.

The parachute can be fabricated with as many stages as may be needed in any specific application, one of the illustrated embodiments being designed as a three-stage parachute, another embodiment being designed as a five-stage parachute. Both parachute embodiments are provided with a composite canopy having a central or inner canopy increment, and a surrounding annular canopy increment. Each canopy increment has a set of suspension lines. An inner set of suspension lines are connected at their upper ends to spaced points on the inner canopy increment, preferably at the gore seams, forming an intermediate annular canopy hem which may be reinforced by a band or the like. An outer set of suspension lines are connected at their upper ends to an outer peripheral hem of the outer canopy increment.

The lower ends of the inner and outer sets of suspension lines are connected at approximately their respective confluence points to corresponding inner and outer control lines, respectively, which control lines extend downwardly and connected to the load.

The novelty of the present invention resides in constructing one or more of the control lines to be extendable, such as providing a loop therein, and of releasably securing the looped portion by a control means, i.e., a break cord, shear link, time delay cutter or other severing-releasing device or the like for changing the length of the respective control line relative to the length of the other control line. A change in length of the respective control lines varies the drag area of one of corresponding canopy increments with respect to the other canopy increment.

In the preferred embodiment, the inner set of suspension lines are fixedly attached at their lower ends to the inner control line which in turn is connected to the load through one or more time delay cutters. The outer set of suspension lines may be connected at their lower ends to the outer control line through one or more break cords. One of the sets of suspension lines at their confluence points may be secured to its control line by means of a ring to threadedly receive freely the other control line and be guided thereby.

It is obvious that the novel parachute can be provided with any number of canopy stages, the specific design depending on the drag requirements in any specific application.

STATEMENT OF THE OBJECTS OF THE INVENTION

A principle object is to provide a multi-stage parachute which is more versatile in applications requiring variable drag requirements.

Another important object of this invention is to provide a multi-stage parachute which can be preprogrammed in a variable and reversible manner, that is, alternately to increase or decrease the canopy drag area to meet changing environmental conditions to which the parachute may be subjected.

A further object is to provide the parachute with a single canopy having a preprogrammed means of changing the parachute canopy drag configuration in a simple, economical and reliable manner.

Other objects, advantages and novel features of the invention will become apparent from the following detailed description of the invention when considered in conjunction with the accompanying drawings.

BRIEF DESCRIPTION OF THE DRAWINGS

FIG. 1 is a side elevation of a novel preprogrammable three-stage parachute shown in the initial first-stage deployed condition, in either a high-speed or low-speed deployment.

FIG. 1A is an enlarged partial perspective view of a modified connection between the lower ends of the outer suspension lines and their outer control line.

FIG. 1B is an enlarged partial perspective view of the releasable connection between the inner and outer control lines of FIG. 1.

FIG. 2 shows the parachute of FIG. 1 when deployed in a high-speed environment, higher than the preprogrammed air speed; the outer canopy increment having assumed a "flag-drag" configuration, being the second stage of a high-speed deployment.

FIG. 3 is a similar view as FIG. 2 showing the parachute assuming a third-stage condition when the value of air speed falls below that preprogrammed, the configuration of the outer canopy increment having been restored to full size shown in the first stage of FIG. 1.

DESCRIPTION OF THE PREFERRED EMBODIMENTS

Figure 4:
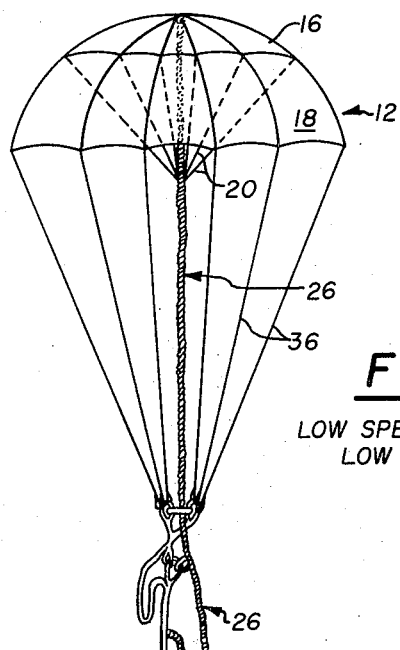
FIG. 4 is a similar view of FIG. 1 when the parachute is initially deployed in a low air speed environment, lower than is preprogrammed, the configuration of the entire canopy remaining full size as in FIG. 1.

Referring to the drawings where like reference numerals refer to similar parts throughout the figures, there is shown in FIGS. 1 through 4 a reversible, three-stage parachute 10, deployed in both high speed and low speed environments. Parachute 10 is protrayed as an independent parachute, although it could be a part of any other parachute system such as a pilot/drogue parachute or the like. In FIGS. 1 to 3 the parachute is deployed in a high speed environment, that is, at a higher speed than is preprogrammed in a manner to be described. As best described with reference to FIG. 1, parachute 10 comprises a composite canopy 12, which may be of conventional construction using radially extending gores or 14 or the like, having a central canopy increment 16 and an outer annular canopy increment 18 integrally joined thereto.

An inner set of suspension lines 20 are connected at their upper ends to spaced points, preferably on the canopy gore seams, forming an intermediate annular canopy hem which may be reinforced by band 22. The lower ends of the inner suspension lines are integrally connected at 24 to an inner control line 26 which is made of relatively non-elastic line. Inner control line 26 is connected at its lower end to a load 28, which may be a seat frame or main parachute or the like depending on the specific application. Inner control line 26 is anchored at its bottom end to load 28. Control line 26 is secured in a foreshortened condition by a slack portion 30 having an integral loop 31 connected to a releasable connection means 32, such as a conventional time-delay cutter device, for a restaging purpose later to be described. Line cutter 32 can be of the well-known type that operates through lapse of a predetermined time, altitude, or during or before a certain event, such as at seat-man separation to increase the differential velocities of the seat and man, etc.

The upper end of inner control line 26 can terminate at suspension line connection 24, or preferably extend upwardly and attached to canopy apex if desired for configuration control, although such a construction is not required for the purpose of this invention.

An outer set of suspension lines 36 are connected at their upper ends to the gore seams at an outer peripheral hem 38, and at their lower ends are attached to a pair of bridle loops 42 which in turn are anchored to a guide ring 40. In an alternate construction in FIG. 1A, the lower ends of suspension lines can be attached directly to guide ring 40. The ends of bridle loops 42 are integrally spliced to an outer control line 44 anchored at 46 to load 28, as is inner control line 26. Like inner control line 26 outer control line 44 may also be constructed of a relatively non-elastic fiber line.

Outer control line 44 is provided with an intermediate looped portion 48 maintained in a slack condition by a releasable break cord 50 threaded through corresponding loops 52 and 54. Break-cord 50, and loops 52 and 54 are spliced at their ends to outer and inner control lines 44 and 26, respectively, as clearly illustrated in FIG. 1B. The general purpose of releasable connection 50, as is releasable connection 32 in inner control line 26., is to release under a preprogrammed sequence, the foreshortened portions 48 and 30 in the respective control lines. The shearing strength of break-cord 50 is generally determined in accordance with the anticipated parachute force generated at a tested desired staging airspeed.

This novel arrangement provides the parachute canopy in a high-speed deployment, sequentially, with a decreasing drag configuration and, thereafter, an increasing drag configuration, or alternately to by-pass such stages when the parachute is deployed initially in a low-speed environment, as more fully described hereinafter in the section on Operation.

The use of guide ring 40 enables inner control line 26 to be guided freely therethrough for the relative movement between the control lines occurring during deployment of the various parachute stages, and as a practical matter the guide ring may be connected in either the inner or outer control lines.

The five-stage parachute illustrated in FIGS. 5 through 10, inclusive, can utilize the same composite canopy 12 and suspension lines as the three-stage parachute of FIGS. 1 through 4. The two additional stages are provided in this modification by employing an additional releasable connection means in each of the inner and outer control lines. To highlight the existing similarities between these two parachute modifications the same reference numerals will be employed for the common devices in the five-stage parachute with the suffix "a" indicating the additional devices.

Figure 5:
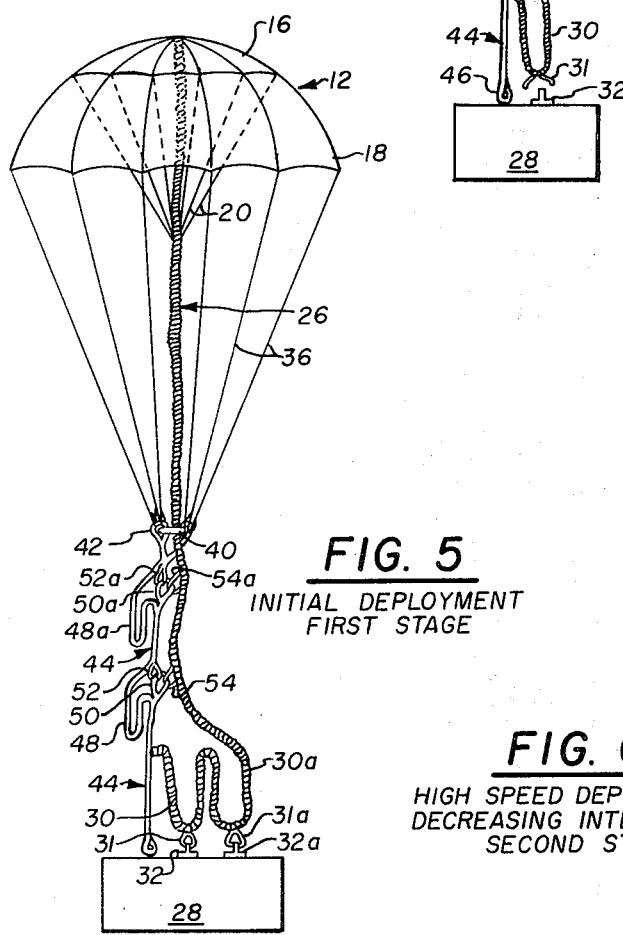
FIG. 5 is a side elevation view of a modified parachute designed with five-stages, shown in the initial first-stage deployment.

In the five-stage parachute, FIG. 5 illustrates the initial deployment of the parachute for both high-speed or low-speed environments, and may be designated as a first-stage condition. FIGS. 6 to 9 illustrate the parachute configuration during the sequential decreasing and increasing drag conditions that can occur in the high-speed deployment, whereas, FIG. 10 shows an initial low-speed deployment developed directly from the first-stage in FIG. 5.

Figure 6:
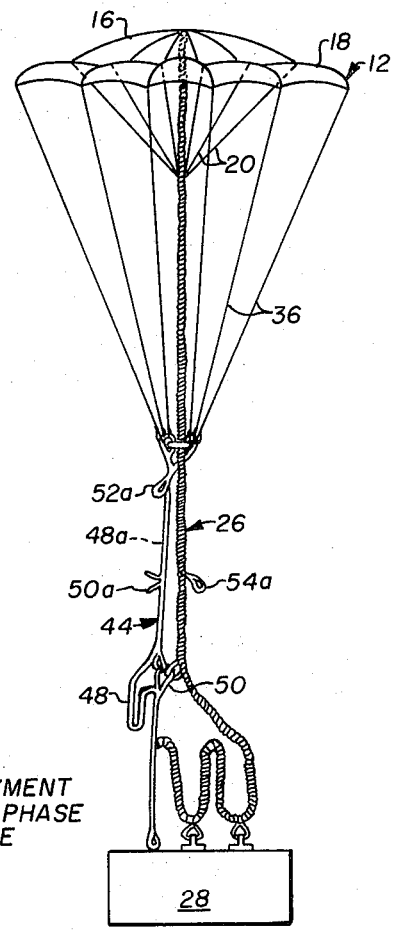
FIG. 6 shows the parachute of FIG. 5 when deployed in a high-speed environment, above a certain programmed intermediate value of air speed, the outer control line having been lengthened to an intermediate length and the outer canopy increment assuming an intermediate decreasing drag configuration, being a second-stage deployment.

As best seen in FIG. 5, one of the ways of creating an additional decreasing drag stage in the five-stage parachute is achieved by providing an additional break cord 50a and a set of corresponding load loops 52a and 54a in the respective outer control line 44 at a spaced location thereon from break cord 50, creating an additional slack portion 48a in control line 44. This construction provides an intermediate decreasing drag orientation of outer canopy increment 18, as shown in FIG. 6. In the embodiment illustrated, break cord 50 is designed with a greater tensile strength than break cord 50a to provide for a sequential operation at different selected airspeeds, however, other combinations may be designed depending on the requirements of any particular deployment.

Figure 8:
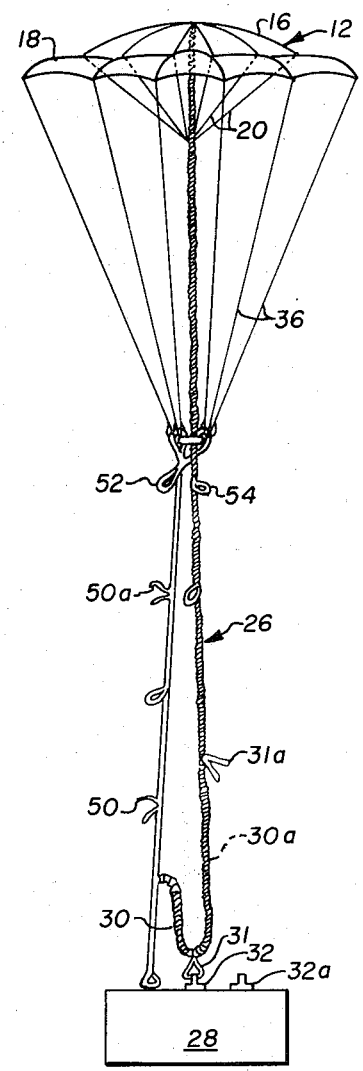
FIG. 8 is a similar view as FIG. 7 wherein the canopy during deployment is allowed to increase the drag configuration of the outer canopy increment by the partial release and lengthening of the inner control line, being a fourth-stage deployment the size of the canopy being identical to that of the second stage in FIG. 6.

Again referring to FIG. 5, the other provision for achieving an additional increasing drag stage of the five-stage parachute is in providing a second releasable connection, i.e., a load loop 31a spliced to inner control line 26 and a time-delay cutter 32a attached to the load. Use of loop 31a and cutter 32a provides a second slack portion 30a in the inner control line which enables the parachute canopy to increase its drag area to the intermediate condition as is shown in FIG. 8. Obviously, different time settings are normally set in cutters 32 and 32a to provide for sequential increasing drag operations, depending on preprogrammed airspeeds.

OPERATION

The operation of the novel parachute is first described with reference to the three-stage parachute in FIGS. 1 through 4. FIG. 1 illustrates the condition of the parachute when initially deployed, being the first-stage, and one where the full canopy is present being the largest of the inflated stages. In the first-stage deployment, the total drag force exerted by the composite canopy is shared between inner and outer control lines 26 and 44, respectively.

If the parachute is deployed in an airspeed environment above the value programmed in break cord 50, the break cord ruptures to disconnect loops 52 and 54. This action releases slack portion 48 in outer control line 44 to extend to its full length, as illustrated in FIG. 2, being referred to as a second-stage deployment. Lengthening of outer control line 44 causes the corresponding outer suspension lines 36 to become relatively slack, and the outer canopy increment 18 assumes a so-called "flag-drag" condition. The inner canopy increment 16 remains static as does its suspension lines 20 and inner control line 26. Consequently, substantially all the applied tension is assumed by the inner suspension lines and their inner control line.

The second-stage parachute condition of FIG. 2 prevails for a preprogrammed time or event as has been set in line-cutter 32, such as when load 28 has decelerated to a designed restaging speed range and an increasing drag is warranted. When line cutter 32 is triggered, load loop 31 is severed to release slack portion 30 in the inner control line 26 enabling it to extend in length to the extent of the length of loop 30, as shown in FIG. 3. This extension of the length of inner control line 26 causes the central canopy increment 16 to move upwardly relative to outer canopy increment 18, restoring the composite canopy to the full condition of FIG. 1 wherein the tension is again shared between both sets of suspension lines and their control lines.

If, on the other hand, the parachute of FIG. 1 is deployed initially in a low-speed environment, the force on break cord 50 will not be sufficient to rupture the connection, and the composite canopy will retain its initial fullness even after line cutter 32 operates in the programmed manner. This low speed deployment is illustrated in FIG. 4. It is not referred to as an additional stage because the area of composite canopy is identical to FIG. 1, and there is no relative change in the length of the control lines that would cause a change in the canopy drag area.

The novel five-stage parachute illustrated in FIGS. 5 through 10, operates similarly as the three-stage parachute of FIGS. 1 through 4, except the provision of a second releasable connection in both inner and outer control lines enables the outer canopy increment 18 to assume an intermediate drag condition in both the decreasing drag and increasing drag phases, presently to be described.

The initial deployment of the five-stage parachute is shown in FIG. 5, which is equivalent to the first stage of the three-stage parachute in FIG. 1. If during deployment the airspeed to which the deployed parachute should be higher than is programmed, the force will cause break cord 54a to break, partially releasing outer control line 44 to the extent of its slack portion 48a. The increase in length of outer control line 44 will cause outer canopy increment 18 to assume an intermediate position presenting a reduced drag area. This condition is shown in FIG. 6 and is referred to as a second-stage deployment.

Figure 7:
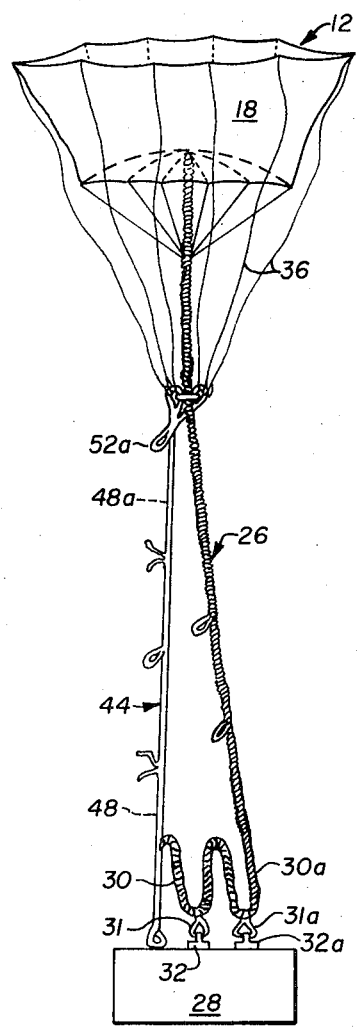
FIG. 7 is a similar view as FIG. 6 when the parachute is deployed in a high-speed environment, above a certain programmed maximum air speed, the outer control line having been lengthened to the full length, and the outer canopy increment assuming a final decreasing "flag-drag" configuration, being a third-stage deployment.

Should the drag forces on the deployed parachute exceed the higher programmed value of tensile strength in the second break cord 54, it too will rupture further increasing the length of outer control line 44 to the extent of its slack portion 48. Release of line 44 causes the outer canopy increment 18, and its corresponding suspension lines 36 to go slack and assume a third-stage "flag-drag" orientation as shown in FIG. 7. The composite canopy now has the identical configuration as in FIG. 2 of the three-stage parachute.

Assuming the load on the parachute in the high-speed deployment has caused the third-stage of FIG. 7 to be deployed, the parachute will remain in its final third-stage phase of its decreasing drag sequence until the preprogrammed time-delay line cutters 32 and 32a are scheduled to operate to reverse the drag condition of the canopy and commence the increasing drag phases.

As illustrated in FIG. 8, line cutter 32a is programmed to be the first to operate severing load loop 31a which releases slack portion 30a in the inner control line 26. Central canopy increment 16 and its associated suspension lines is allowed to move upwardly relative to outer canopy increment 18, causing the latter to change from its no-load condition of FIG. 7 to an intermediate-load condition in FIG. 8, and increasing the total drag surface of the parachute. The parachute deployment in FIG. 8 is the fourth-stage.

Figure 9:
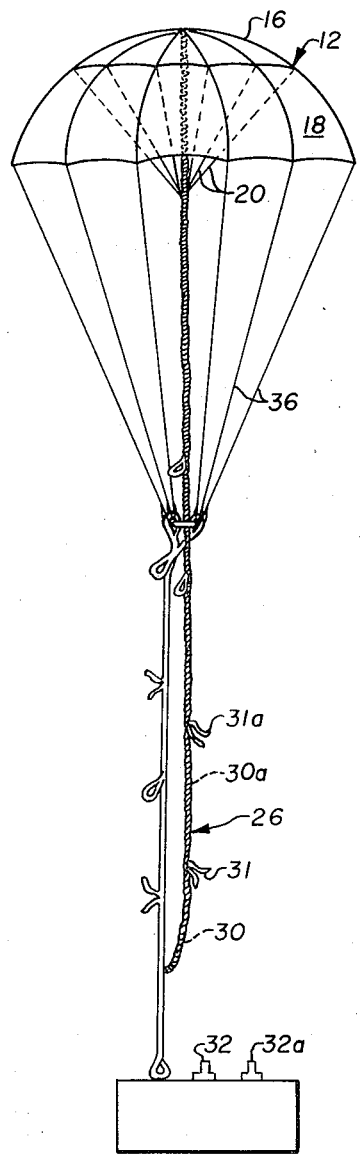
FIG. 9 is a similar view as FIG. 8 wherein the drag configuration of the outer canopy increment is allowed to increase further to its full size, being a fifth-stage deployment, the size of the canopy being identical to that of the first stage of FIG. 1.
Figure 10:
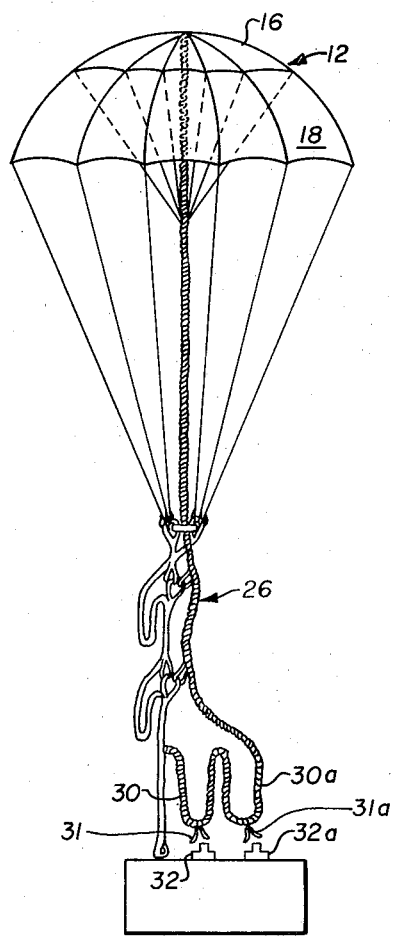
FIG. 10 is a similar view as FIG. 5 in which the parachute is deployed initially in a low speed environment, below a certain programmed value of air speed, the parachute canopy retaining its full size even though the inner control line has been released by the respective releasable means.

When line cutter 32 subsequently operates to sever load loop 31 and release slack portion 30, the total drag surface of the parachute is still further increased to the full-drag condition, as shown in FIG. 9, being the fifth stage. It can be seen that the fifth-stage restores the composite canopy to the original first-stage condition in FIG. 5, accomplished by allowing the length of both control lines to be fully extended.

If, however, the five-stage parachute of FIG. 5 is initially deployed in a low-speed environment, instead of a high-speed environment as previously described with reference to FIGS. 5 to 9, the tension will not exceed the programmed value that will cause separation of either break cord 50 or 50a and these devices remain intact. Thus, when line cutters 32 and 32a ultimately operate in the programmed manner to release the respective inner control load loops 30 and 30a, the composite canopy will remain in the full-drag condition as in FIG. 5 because the effective lengths of the control lines remain unchanged. Accordingly, the low-speed deployment of the five-stage parachute in FIG. 10, is similar in operation to the low-speed deployment of the three-stage parachute in FIG. 4.

The novel reversible, three-stage and five-stage parachutes, FIGS. 1 through 4 and FIGS. 5 through 10, respectively, are shown for illustration purposes only, and it is apparent that any number and arrangement of programmable releasable devices can be incorporated in the inner and outer control lines to control their relative lengths. It should be noted that these control devices are located at a position outside the parachute canopy, and therefore, less subject to damage by the developed forces. Likewise, the composite canopy is shown as having two increments with a corresponding pair of control lines, and this construction is also by way of illustration, as any number of canopy increments and/or number of releasable connections can be utilized. Likewise, the number of decreasing and increasing drag stages can be varied to meet changing environmental conditions to which the parachute may be subjected. The types of releasable connections, such as break cords, line cutters, etc., can be chosen from a large selection of available devices, depending on the requirements of the specific applications involved. As illustrated, the break cords are used in the outer control line to decrease the canopy drag area, and the time-delay cutters or the like are employed in the inner control line to increase the canopy drag area. It is obvious that any other arrangement or combination may be feasible for different operational requirements.

Obviously many modifications and variations of the present invention are possible in the light of the above teachings. It is therefore to be understood that within the scope of the appended claims the invention may be practiced otherwise than as specifically described.

What is claimed is:

1. A reversible, variable drag, multi-stage parachute comprising:
   a composite canopy having an inner canopy increment and at least one outer annular canopy increment;
   an inner set of suspension lines connected at their upper ends to spaced points around an annular hem along the inner canopy increment, and connected at their lower ends to an inner control line;
   an outer set of suspension lines for each outer canopy increment connected at their upper ends to spaced points around an annular hem along the respective outer canopy increment, and connected at their lower ends to an outer control line;
   said inner and outer control lines being substantially non-elastic and variable in length with respect to each other during deployment;
   each of said control lines having releasable means for maintaining the respective control lines in foreshortened condition;
   whereby operation of said releasable means will vary the length of the control lines relative to each other to increase or decrease the drag area of the respective canopy increments in accordance with predetermined drag forces applied to the parachute during deployment providing a reversible drag capability.

2. The parachute of claim 1 wherein at least one of said releasable means is operable by a time-delay device.

3. The parachute of claim 2 wherein said time-delay device connects the inner control line to the load.

4. The parachute of claim 2 wherein said time-delay device is connected to the inner control line.

5. The parachute of claim 2 wherein a plurality of time-delay devices are connected at spaced locations along the inner control line.

6. The parachute of claim 1 wherein at least one of said releasable means is operable by a break cord designed to be severed upon the application of a predetermined force.

7. The parachute of claim 6 wherein said break cord is located in the outer control line.

8. The parachute of claim 6 wherein a plurality of break cords are located at spaced locations along the outer control line.

9. The parachute of claim 1 wherein the length of the control lines are made variable in length by providing a looped portion therein secured by the respective releasable means.

10. The parachute of claim 1 wherein a plurality of releasable means are provided in spaced locations in said control lines for controlling their respective lengths.

11. A method of reversibly changing the drag area of a multi-stage parachute capable of being deployed in an air speed environment excessive to a predetermined value having a composite canopy with inner and outer increments, and a set of suspension lines connected to a respective control line, each control line having at least one releasable means for controlling the foreshortened length of the control lines, the steps including:
first activating the releasable means to the outer control line to reduce the effective drag area of the outer canopy increment;
subsequently activating the releasable means to the inner control line to restore the original condition of the outer canopy increment.

* * * * *